Figure 1:
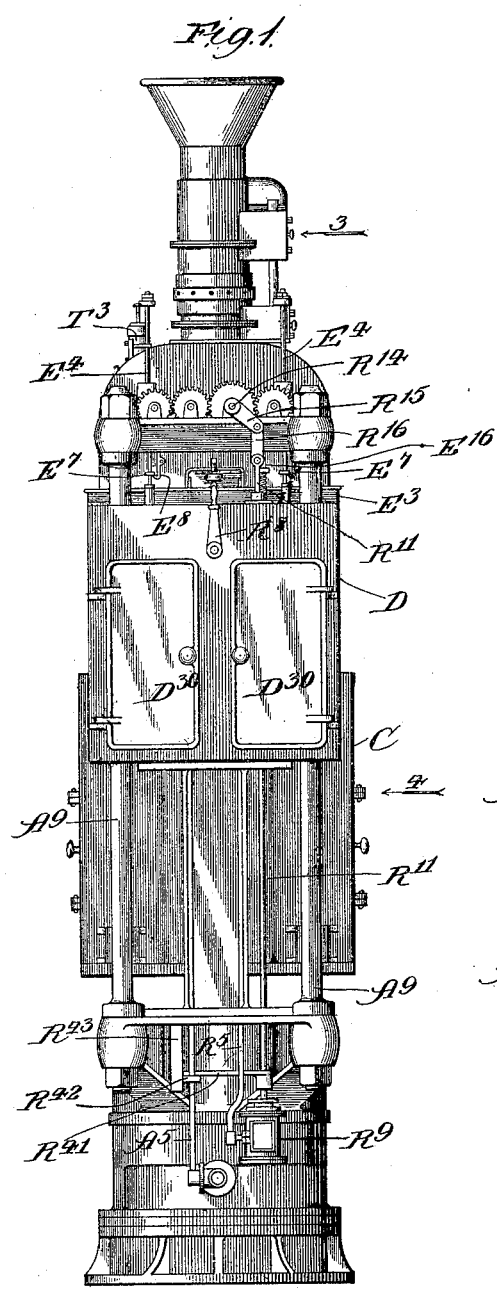

No. 632,243. Patented Sept. 5, 1899.
H. C. COOPER.
SAND MOLDING MACHINE.
(Application filed June 8, 1899.)

(No Model.) 12 Sheets—Sheet 1.

WITNESSES.

INVENTOR
Harry C. Cooper
By
Walter H. Chamberlin
ATTORNEY

No. 632,243. Patented Sept. 5, 1899.
H. C. COOPER.
SAND MOLDING MACHINE.
(Application filed June 8, 1899.)

(No Model.) 12 Sheets—Sheet 2.

WITNESSES.

INVENTOR
Harry C. Cooper
By
Walter H. Chamberlin
ATTORNEY.

No. 632,243. Patented Sept. 5, 1899.
H. C. COOPER.
SAND MOLDING MACHINE.
(Application filed June 8, 1899.)
(No Model.) 12 Sheets—Sheet 3.

WITNESSES.

INVENTOR
Harry C. Cooper
By Walter H. Chamberlin
ATTORNEY.

No. 632,243. Patented Sept. 5, 1899.
H. C. COOPER.
SAND MOLDING MACHINE.
(Application filed June 8, 1899.)
(No Model.) 12 Sheets—Sheet 4.

WITNESSES.

INVENTOR
Harry C. Cooper
By
Walter H. Chamberlin
ATTORNEY.

No. 632,243. Patented Sept. 5, 1899.
H. C. COOPER.
SAND MOLDING MACHINE.
(Application filed June 8, 1899.)

(No Model.) 12 Sheets—Sheet 5.

WITNESSES.

INVENTOR
Harry C. Cooper
By
ATTORNEY.

No. 632,243. Patented Sept. 5, 1899.
H. C. COOPER.
SAND MOLDING MACHINE.
(Application filed June 8, 1899.)
(No Model.) 12 Sheets—Sheet 6.

WITNESSES.

INVENTOR
Harry C. Cooper
By
ATTORNEY.

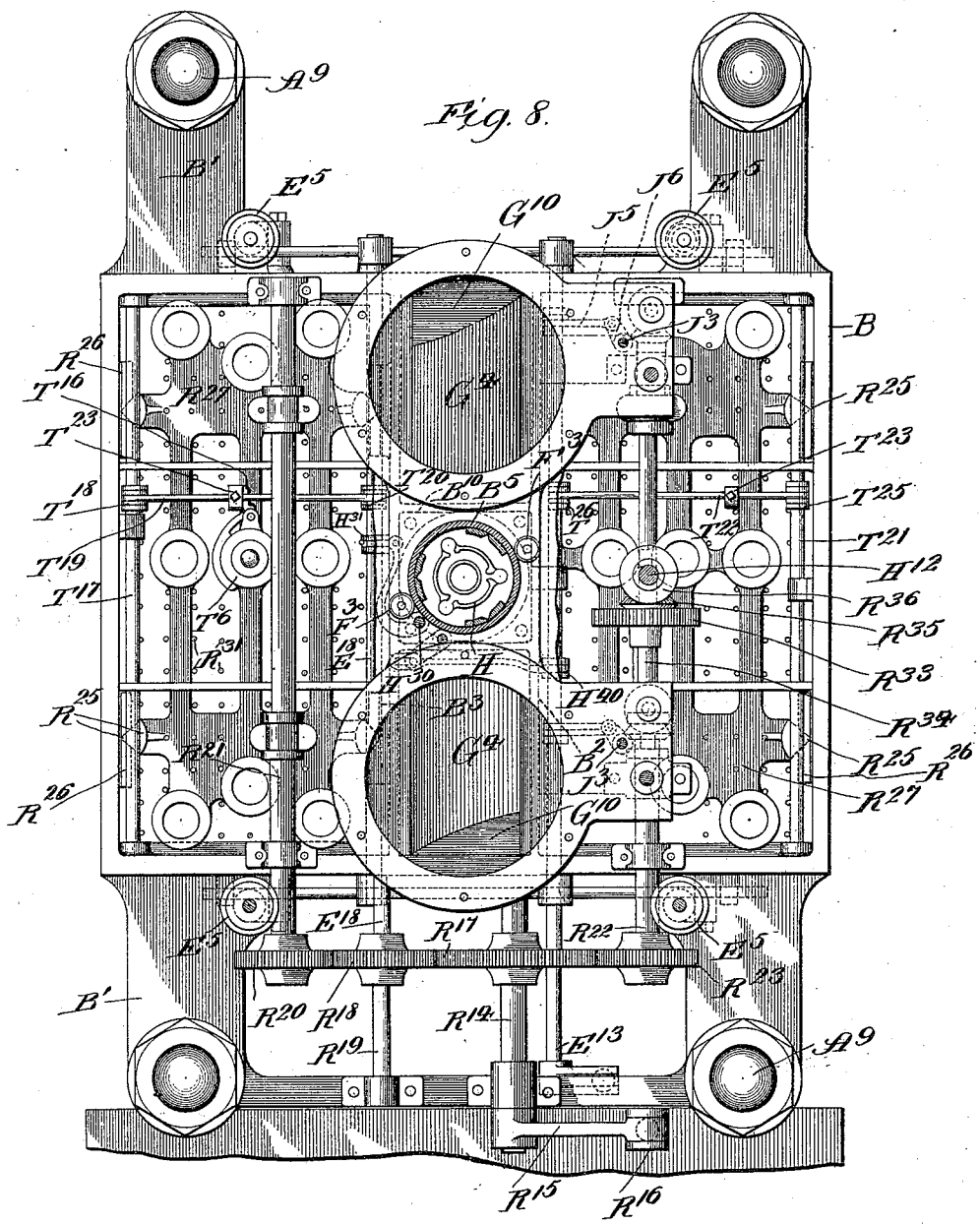

No. 632,243. Patented Sept. 5, 1899.
H. C. COOPER.
SAND MOLDING MACHINE.
(Application filed June 8, 1899.)
(No Model.) 12 Sheets—Sheet 8.
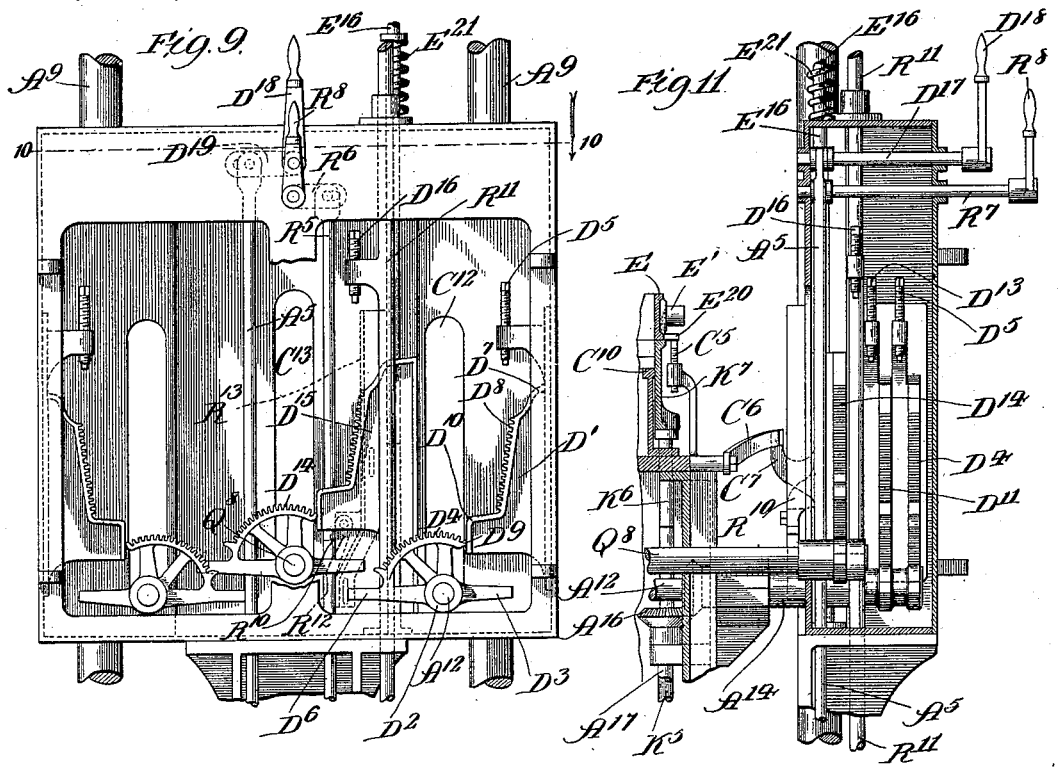
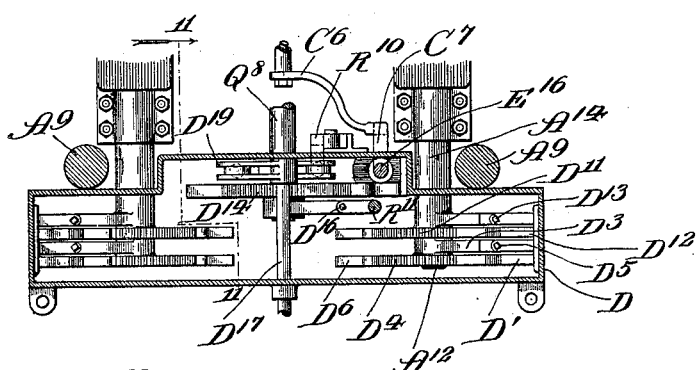
WITNESSES
INVENTOR
Harry C. Cooper
By
ATTORNEY.

No. 632,243. Patented Sept. 5, 1899.
H. C. COOPER.
SAND MOLDING MACHINE.
(Application filed June 8, 1899.)
(No Model.) 12 Sheets—Sheet 9.
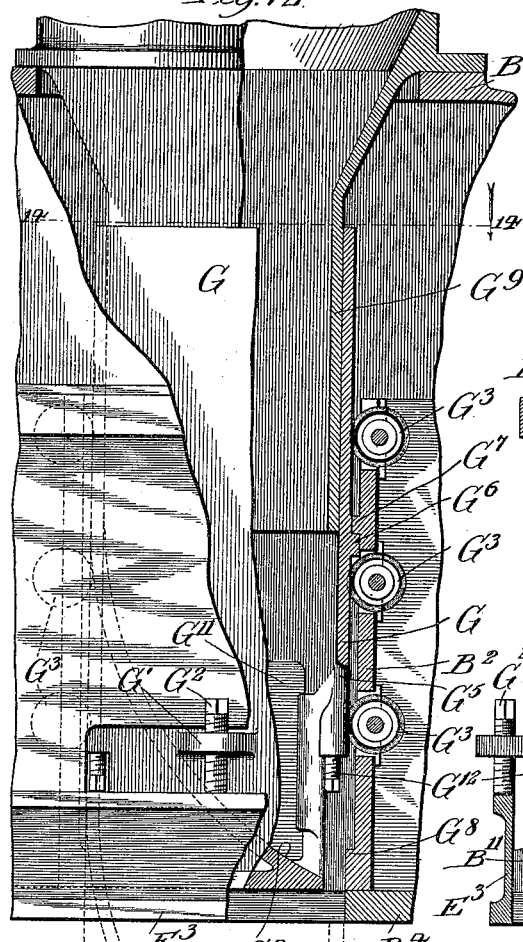
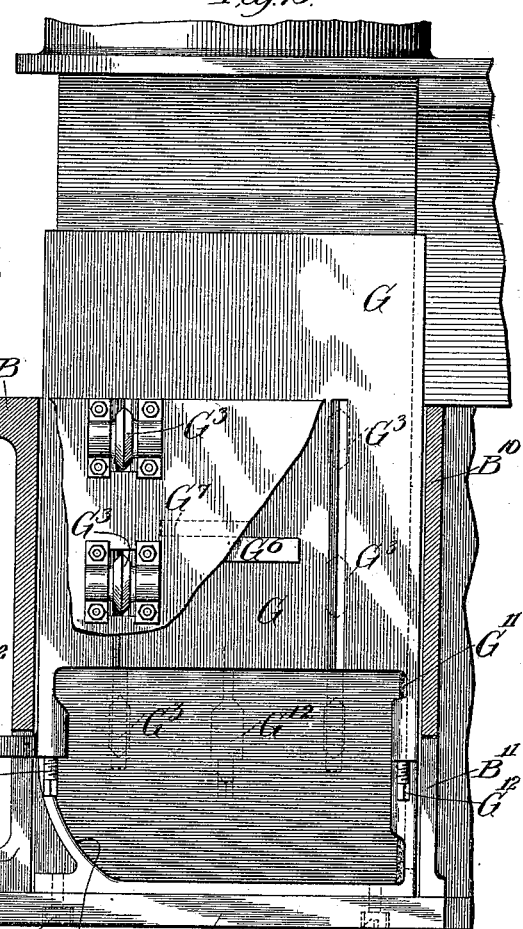
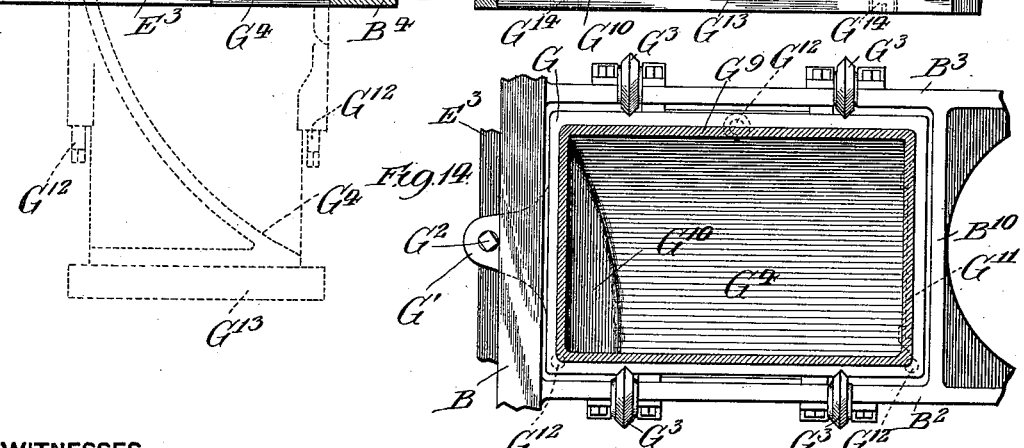
WITNESSES
INVENTOR
Harry C. Cooper
By
Walter H. Chamberlin
ATTORNEY.

No. 632,243. Patented Sept. 5, 1899.
H. C. COOPER.
SAND MOLDING MACHINE.
(Application filed June 8, 1899.)
(No Model.) 12 Sheets—Sheet 10.
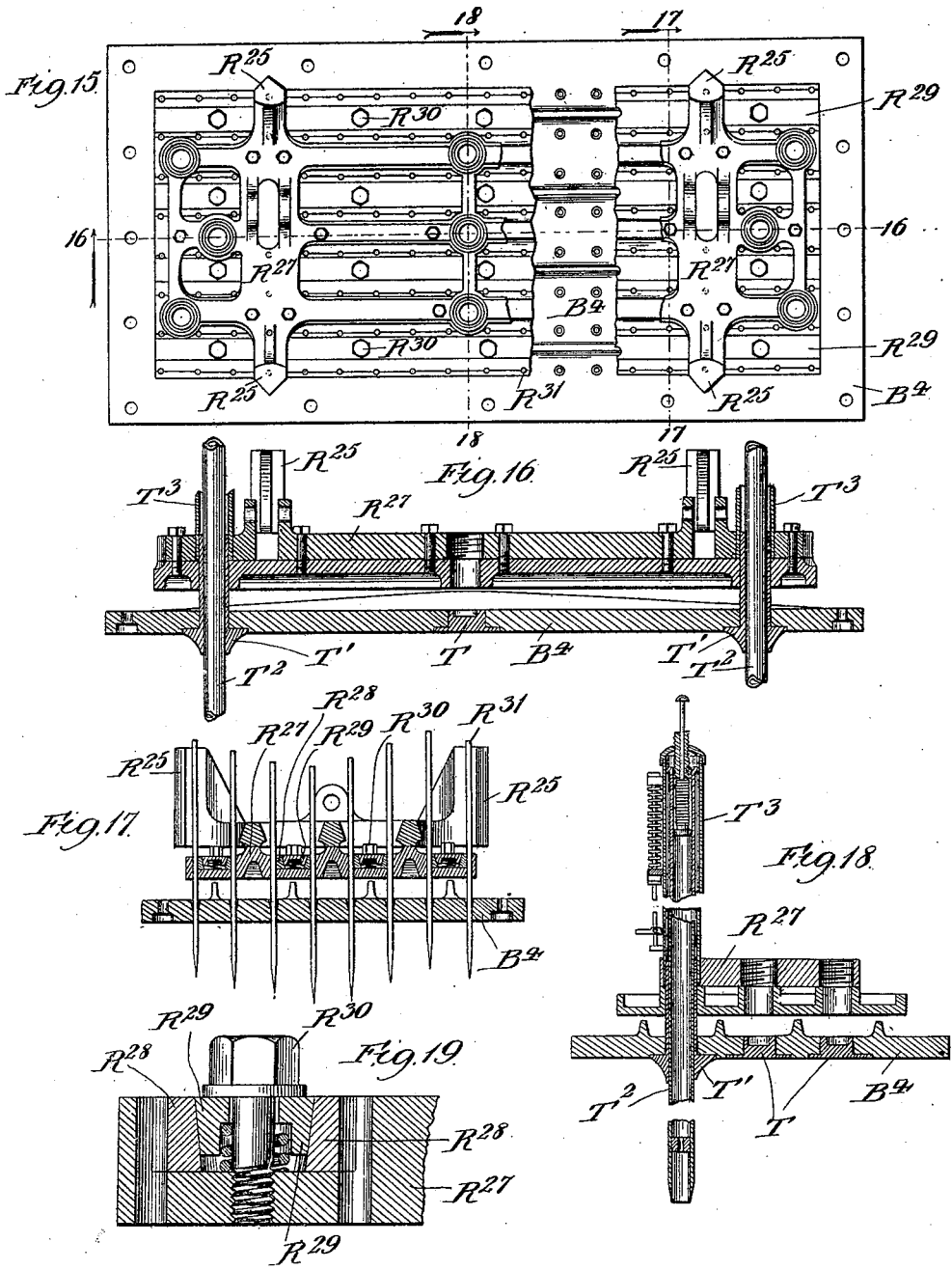
WITNESSES.
INVENTOR
Harry C. Cooper
By
ATTORNEY.
THE NORRIS PETERS CO., PHOTO-LITHO., WASHINGTON, D. C.

No. 632,243. Patented Sept. 5, 1899.
H. C. COOPER.
SAND MOLDING MACHINE.
(Application filed June 8, 1899.)
(No Model.) 12 Sheets—Sheet 11.
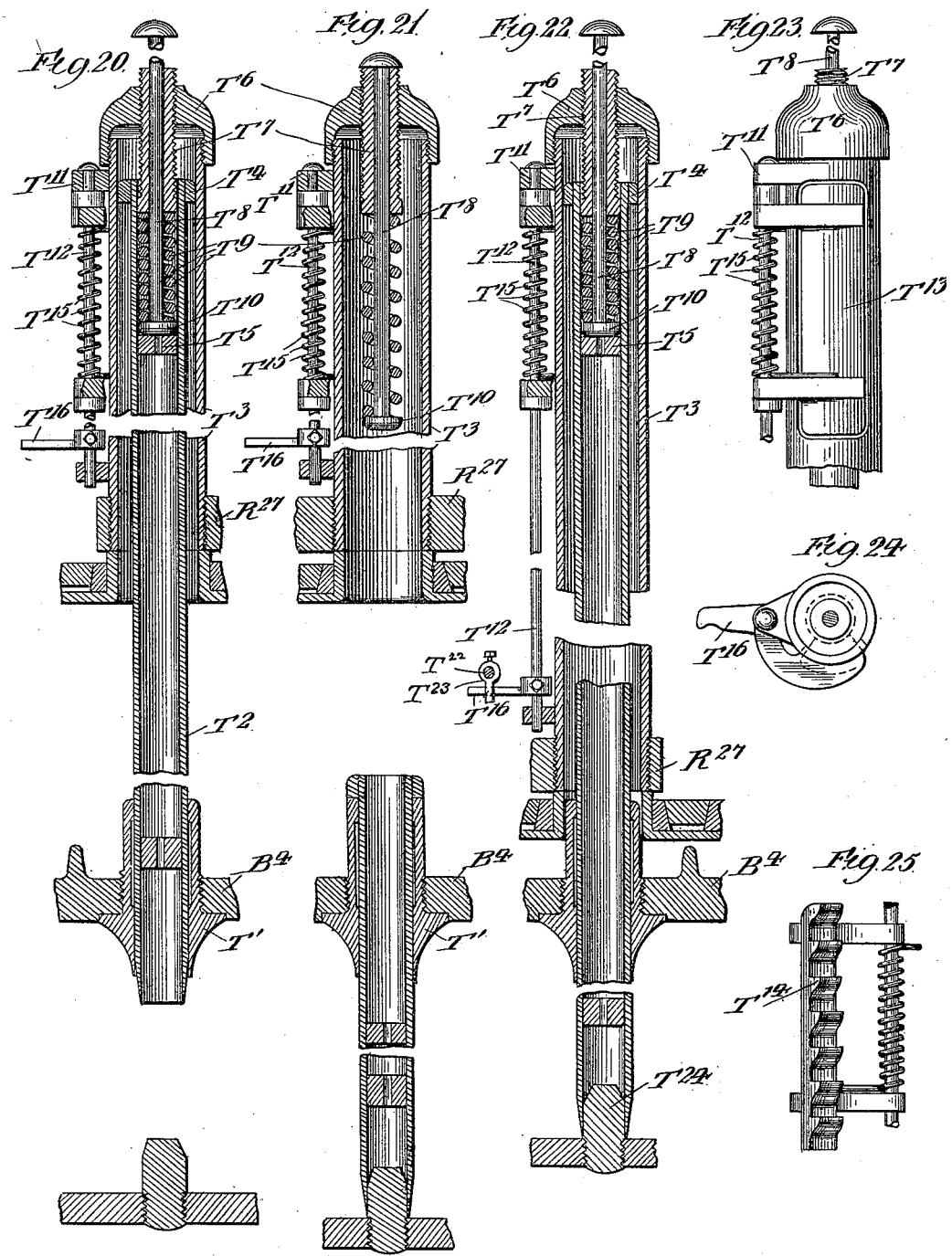

No. 632,243. Patented Sept. 5, 1899.
H. C. COOPER.
SAND MOLDING MACHINE.
(Application filed June 8, 1899.)
(No Model.) 12 Sheets—Sheet 12.
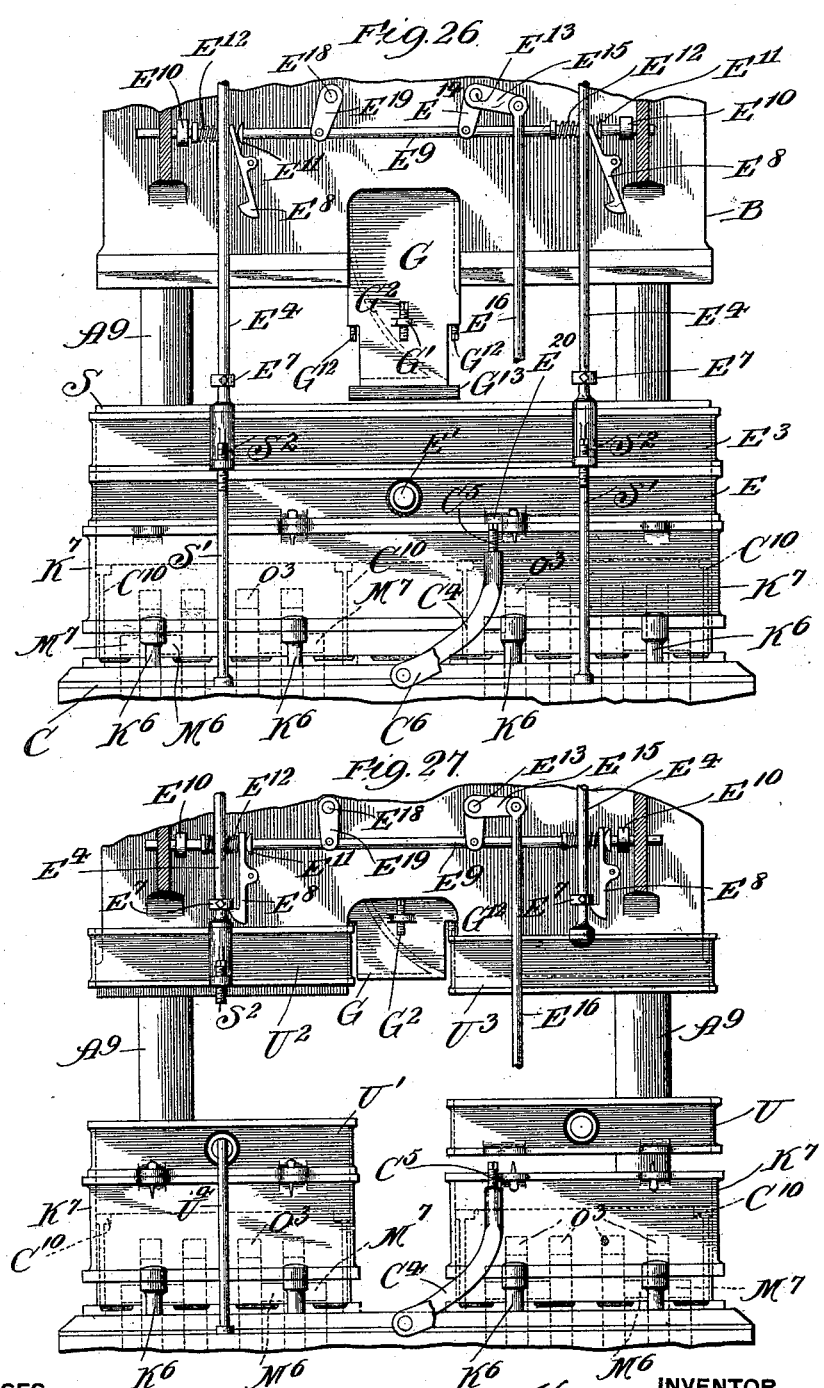

UNITED STATES PATENT OFFICE.

HARRY C. COOPER, OF CHICAGO, ILLINOIS.

SAND-MOLDING MACHINE.

SPECIFICATION forming part of Letters Patent No. 632,243, dated September 5, 1899.

Application filed June 8, 1899. Serial No. 719,817. (No model.)

*To all whom it may concern:*

Be it known that I, HARRY C. COOPER, a citizen of the United States, residing at Chicago, county of Cook, State of Illinois, have invented a certain new and useful Improvement in Sand-Molding Machines; and I declare the following to be a full, clear, and exact description of the invention, such as will enable others skilled in the art to which it pertains to make and use the same, reference being had to the accompanying drawings, which form part of this specification.

My invention has for its object the production of a molding-machine for use more particularly in forming sand molds. In its general operation and in some of its specific operations it is similar to the mechanism shown and described in my concurrently-pending application filed December 19, 1898, Serial No. 699,720. It is similar in its general operation in that from the time the empty flask is inserted in the machine to the time when the flask containing the formed mold is removed from the machine the same operations are performed in substantially the same chronological order. It is similar in some of its specific operations in that with some changes in the specific forms of mechanism the mechanism for dropping the outer false flask, the inner false flask, the sprues, the sand, the advancing of the patterns into the flask, the insertion of the vent-pins, the filling of the sand-reservoir, and the stripping of the parts from the completed mold are substantially the same. It differs, however, as stated above, in the specific mechanism for accomplishing the above results in some instances and differs somewhat more materially in the mechanism for carrying the flask and pattern parts and advancing the latter into the flask. In the former case also I illustrated and described two separate machines, one for forming the cope and the other the drag of the mold. In my present application I show and describe a machine which by changing some adjustments and substituting some of the minor parts for others can be made capable of performing several different operations. The mechanism can be so arranged that it will form both the cope and the drag of a mold at one operation of a pattern capacity of, say, for sake of illustration, eighteen by thirty-six square, or by a change of parts and adjustments the same machine can be made to form the cope of a pattern capacity of, say, thirty-six by thirty-six square, or by a change of parts and adjustments the machine can be made to form the drag of a pattern capacity of thirty-six by thirty-six square. In other words, there is provided two sets of mold-forming mechanism in the one machine, either set capable of forming the particular kind or kinds of molds desired, and these two sets can be combined and operated to form a single mold.

The invention consists in a combination of devices and appliances hereinafter more fully described and claimed.

Figure 2:
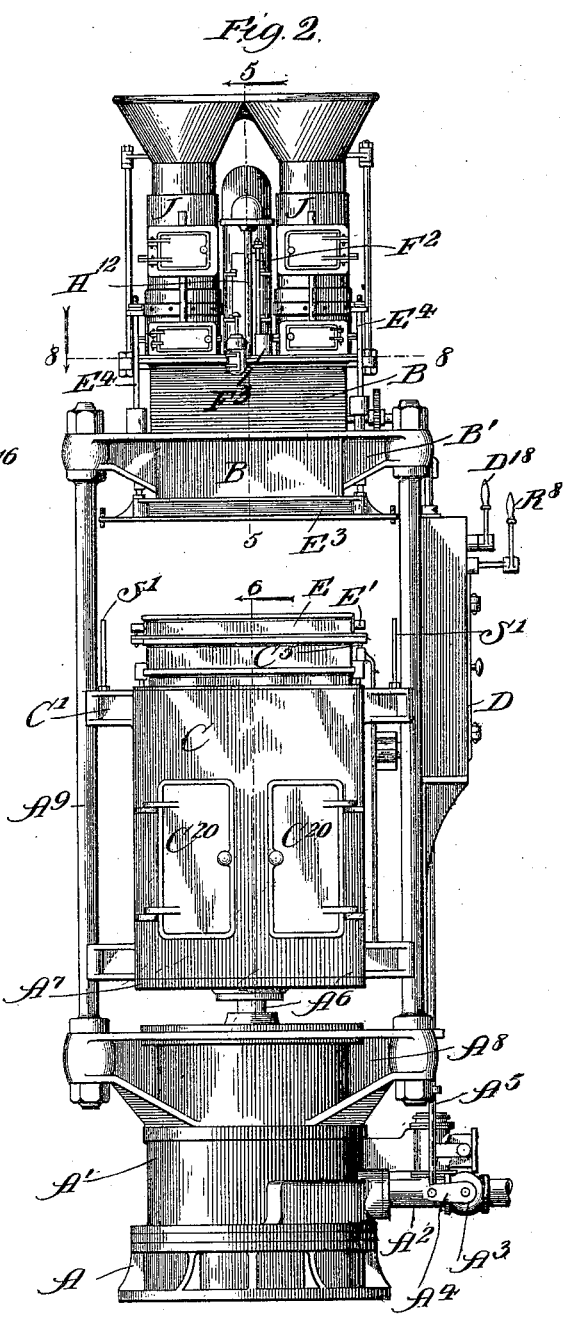
Figure 3:
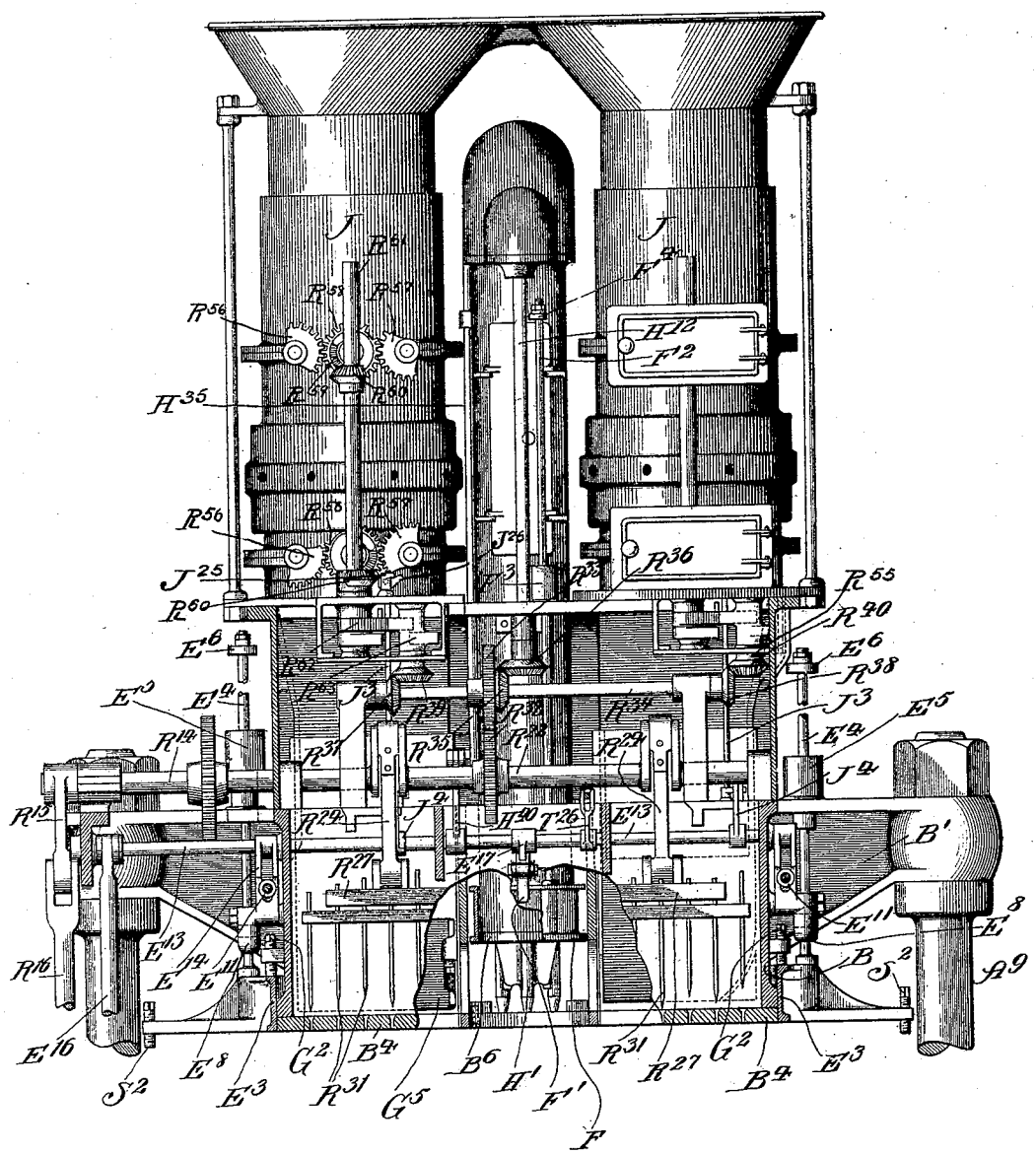
Figure 4:
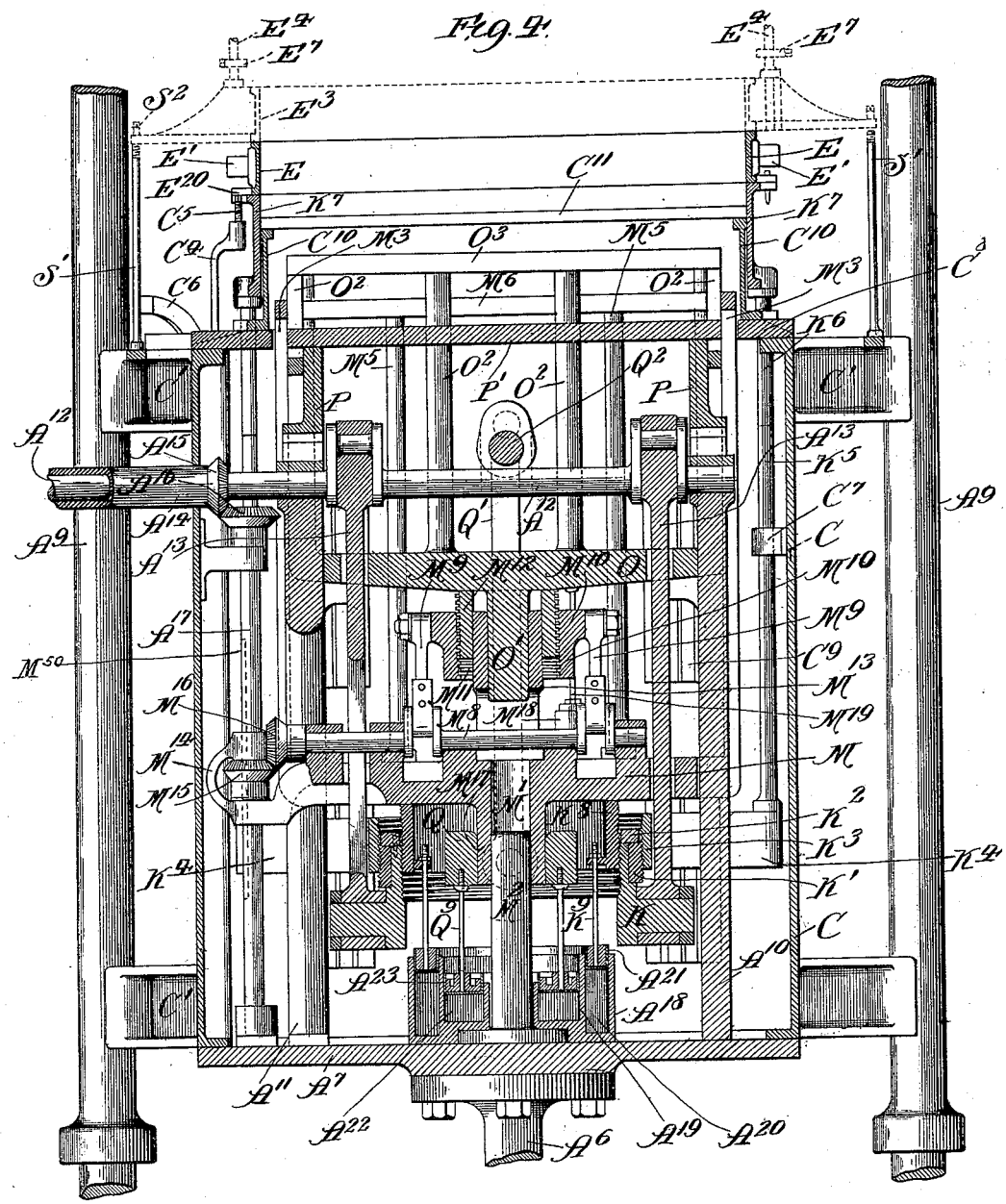
Figure 5:
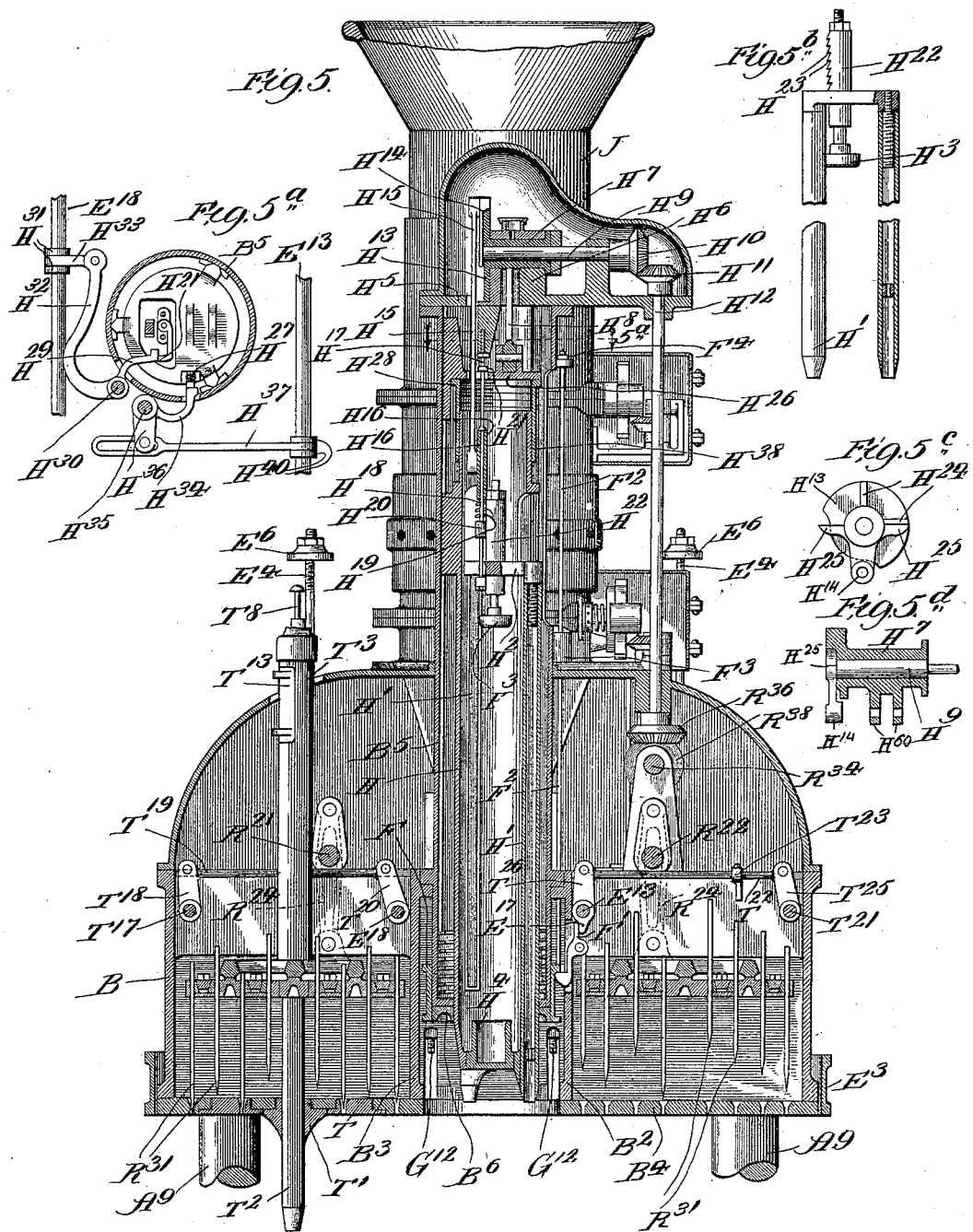
Figure 6:
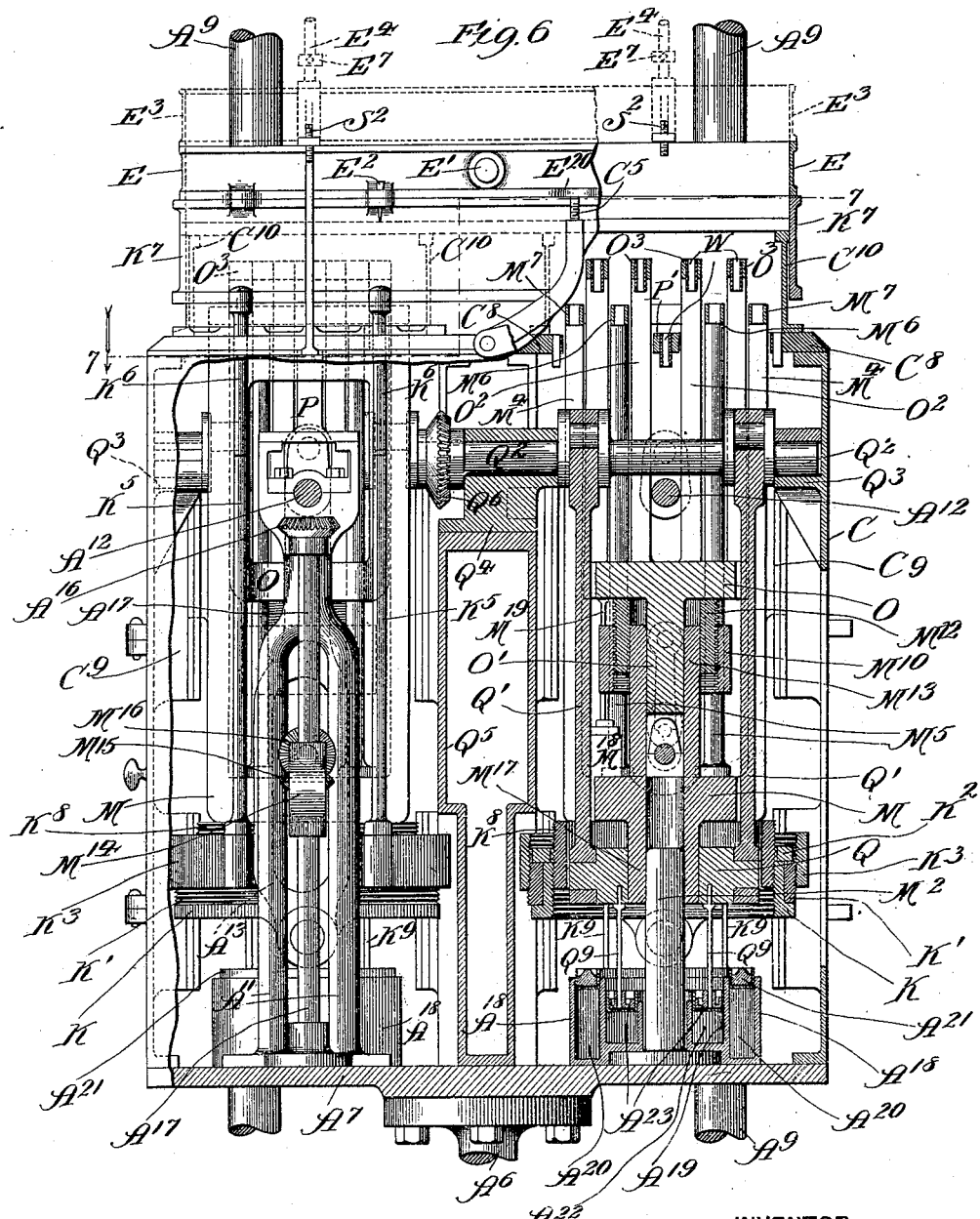
Figure 7:
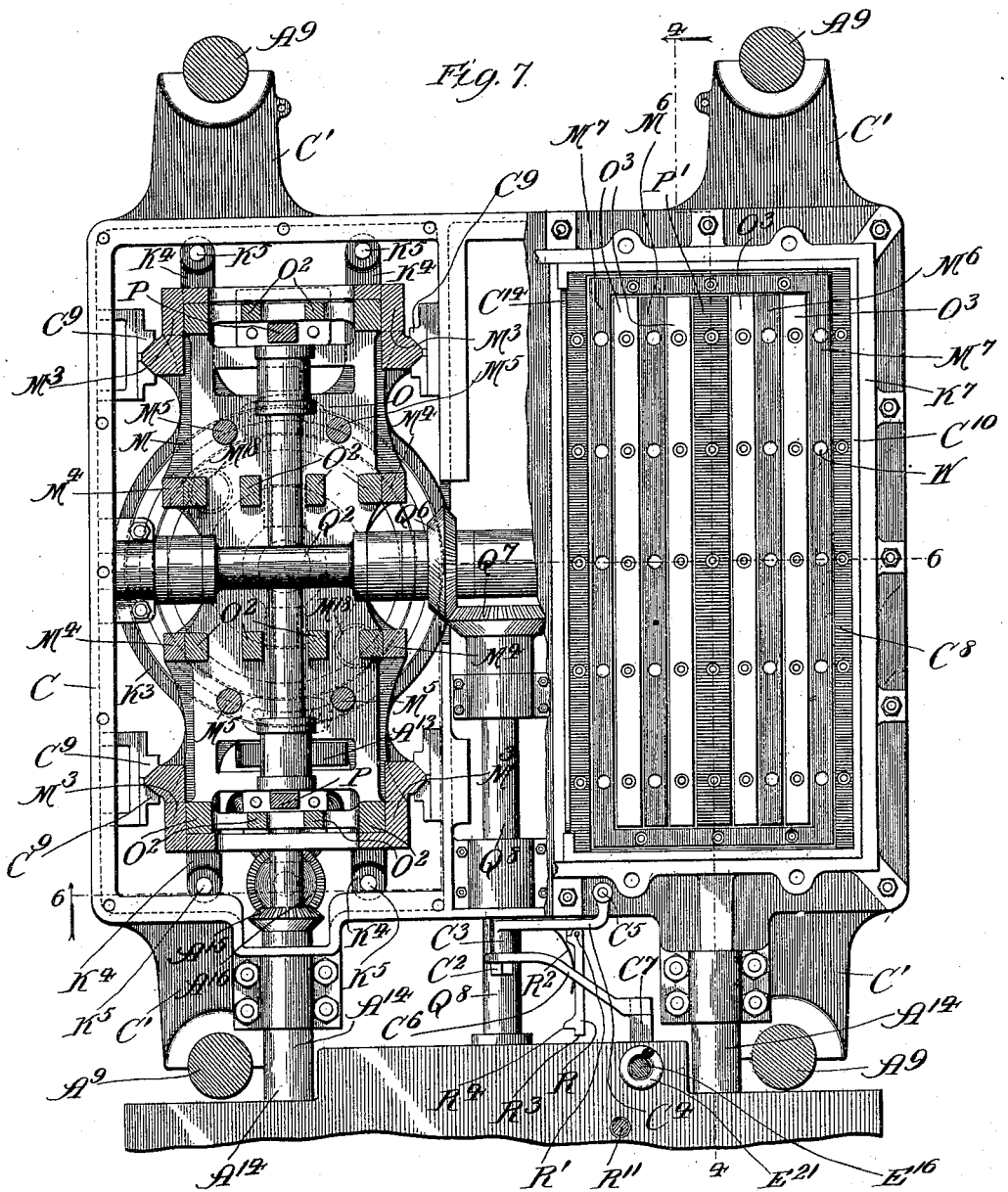

In the drawings, Figure 1 is an end elevation of my machine. Fig. 2 is a side elevation of the same. Fig. 3 is a view of the upper portion of the machine, partly in elevation and partly in section, looking in the direction of arrow 3, Fig. 1. Fig. 4 is a vertical section with some parts in elevation, looking in the direction of arrow 4, Fig. 1, and taken, substantially, on the line 4 4 of Fig. 7. Fig. 5 is a view of the upper portion of the machine and taken, substantially, on the line 5 5 of Fig. 2. Fig. 5$^a$ is a cross-section on the line 5$^a$ 5$^a$ of Fig. 5. Fig. 5$^b$ is a detail illustrating the plunger-sprues. Figs. 5$^c$ and 5$^d$ are details of the plunger and sprue lifting mechanism. Fig. 6 is a view looking in the direction of arrow 6, Fig. 2, and taken, substantially, on the line 6 6 of Figs. 2 and 7. Fig. 7 is a cross-section taken on the line 7 7 of Fig. 6. Fig. 8 is a plan view of the upper portion of the machine with the parts above the line 8 8 of Fig. 2 removed. Fig. 9 is an elevation of a portion of the machine, showing the tripping mechanism. Fig. 10 is a cross-section on the line 10 10 of Fig. 9. Fig. 11 is a vertical section on the line 11 11 of Fig. 10. Fig. 12 is a view, partly in elevation and partly in section, illustrating the construction of the sand-delivery boxes. Fig. 13 is an elevation at right angles to Fig. 12 with some parts in section. Fig. 14 is a cross-section on the line 14 14 of Fig. 12. Fig. 15 is a plan view of the vent-pin plate and sprue-holder plate. Fig. 16 is a vertical section on the line 16 16 of Fig. 15. Figs. 17, 18, and 19 are sectional views illustrating one of the sprues and vent-pins. Figs.

20, 21, 22, and 23 are views illustrating the construction of the sprues. Fig. 24 is a plan view of the parts shown in Fig. 23 with the cap removed. Fig. 25 is a detail illustrating the rack-bar for engaging the sprue. Fig. 26 is an end elevation of a portion of the machine, illustrating the relation of the flask and pattern supporting parts where a single flask is used. Fig. 27 illustrates the same parts where two flasks are used.

In carrying out the invention, A, Figs. 1 and 2, represents a suitable base-plate, and A' a cylinder supported thereby, having an inlet-pipe $A^2$ for the admission of the power fluid controlled by a valve $A^3$, the valve being operated by the arm $A^4$ and vertically-movable rod $A^5$. The apparatus for moving this rod will be later described. Within this cylinder is a piston, and projecting from the cylinder is a piston-rod $A^6$, carrying on its upper end a suitable plate $A^7$. (Shown in Figs. 4 and 6.) From this plate $A^7$ all of the pattern and flask supporting parts are carried. Any desired operating fluid may be used to raise and lower the piston and its accompanying plate $A^7$, or, if desired, any other means, such as purely mechanical means, could be employed for raising this plate. Such substitutions are so well known that I will not further describe them. Referring now to Figs. 1 and 2, it will be observed that arms $A^8$ extend from the cylinder and these support vertical guide and supporting rods $A^9$. Carried by the upper ends of these rods is a casing B, having arms B', which are engaged to the rods $A^9$. Supported by the casing B are the upper works of the machine. Carried by the plate $A^7$ is another casing C, Figs. 1 and 2, and extending therefrom are arms C', which engage the guide-rods $A^9$, and thus guide the casing in its vertical movement. It will thus be seen that the machine is comprised of three distinct parts—to wit, the cylinder or base, the upper works contained within the casing B and supported from the cylinder by the rods $A^9$, and the pattern and flask supporting and operating parts carried by the plate $A^7$ and within the casing C and movable vertically to and from the upper works by means of the piston in the cylinder. In addition to these three principal parts there is a casing D, Figs. 1 and 2, engaged to two of the supporting-rods $A^9$, containing the tripping mechanism for operating the pattern and flask supporting parts in their vertical movement. Access is gained to the casing C by means of the doors $C^{20}$, hinged to the casing, and to the casing D by means of the doors $D^{30}$, hinged to the casing D.

E is the flask. (Shown in several figures, among them Figs. 2, 4, and 6.) It is provided with trunnions E' and pins $E^2$, Fig. 6, the latter adapted to insure its registration with the flask-support, to be later described. This flask can be placed in position in the machine by any desired means—as, for instance, the crane mechanism shown in my prior application.

In order that the machine may be more easily understood, I will describe the various mechanisms in the order in which they operate. In making this preliminary description I will also describe the parts adapted to make the cope portion of the flask. We will assume that the flask has been swung into position ready to be lowered to its place in the machine.

*Outer false flask.*—$E^3$, Figs. 1, 2, 3, and 5, represents the outer false flask, provided with rods $E^4$, Fig. 3, passing through and guided by dash-cups $E^5$, supported from the casing B, the upper end of each rod provided with a plunger $E^6$, adapted to enter the dash-cup and cushion the descent of the false flask when released. On each rod is an adjustable collar $E^7$, Figs. 1, 26, and 27. Pivoted to the casing B adjacent to each rod $E^4$ is a beveled catch $E^8$, Fig. 26. $E^9$ is a rod carried in the boxes $E^{10}$ on the side of the casing B and movable longitudinally in said boxes. On the rod, adjacent to each beveled catch $E^8$, is a shoulder $E^{11}$, which when the rod is moved bears on the catch and tilts it. Surrounding the rod, adjacent to each catch, is a spring $E^{12}$, which bears upon the opposite side of said catch, thus allowing the catch to yield independent of the rod $E^9$ when it engages the collar $E^7$ on the rod $E^4$. On the opposite side of the casing the above-described parts for operating the catches are duplicated. A shaft $E^{13}$ extends through the casing, Figs. 8 and 26, and is connected with each rod $E^9$ by a link $E^{14}$. Extending from the shaft $E^{13}$ is an arm $E^{15}$, and pivoted thereto is a vertically-movable rod $E^{16}$. Obviously when the latter is moved downward it operates each rod $E^9$ to release the catches $E^8$ from the collars $E^7$, and thus allows the false flask to drop onto the flask proper.

*Inner false flask.*—F represents the inner false flask, Fig. 5, engaged in its upper position by a beveled catch F', pivoted to the wall of the partition $B^2$ within the casing B, Figs. 3 and 5. The end of this beveled catch terminates adjacent to the shaft $E^{13}$ previously described, Fig. 5, and on this shaft is an arm $E^{17}$, which when the shaft is revolved strikes the beveled catch F', tilts it out, and releases the false flask F. The latter is provided with guide-rods $F^2$, passing through the dash-cups $F^3$, Figs. 3 and 5, and each provided on the upper ends with a plunger $F^4$, which, entering the dash-cup, cushions the false flask when it drops. The latter drops down onto the runner-box of the flask. I have not shown this runner-box, since it is fully described in my previous application.

*Sand-delivery boxes.*—Referring now to Fig. 8, $B^2$ and $B^3$ represent vertical partitions within the casing B. Located between these partitions are the sand-delivery boxes G. (Shown in detail in Figs. 12, 13, and 14.)

Projecting from the face of the sand-box G is a lug G', carrying a set-screw $G^2$, which bears upon the false flask. Journaled in the partitions $B^2$ $B^3$ are beveled antifriction-rollers $G^3$ to relieve the friction when the boxes are moved vertically. Since the sand-delivery boxes thus rest on the false flask, they are held in their upper position thereby, and a plate $G^{13}$ is engaged by screws $G^{14}$ to the bottom of each sand-box, and when the boxes are in their normal or upper position these plates close the openings in the pressure-plate through which the sand-boxes drop. The bottom of each box is inclined or curved, as shown by dotted lines, Fig. 12, and as shown by full lines $G^4$, Figs. 8 and 14, the incline for one box being in the opposite direction to that of the other box. The side of each box at the base of the incline is provided with an opening $G^5$, through which the sand is discharged. A stop $G^6$, engaging a corresponding stop $G^7$ on the partition $B^2$, limits the upward movement of the box, and a stop $G^8$ on the partition limits the downward movement of the box. Connecting with the sand-reservoirs (which I will presently describe) is a sand-chute $G^9$, the latter being supported by the casing B, and the box G fits over and telescopes with this sand-chute. Now it is obvious that when the false flask drops it will allow the sand-delivery box to drop down until arrested by the stop $G^8$. This leaves the upper edge of the opening in the sand-box just below the pressure-plate $B^4$, so that when the sand is discharged from the reservoir, as will be later described, it comes down through each box and is discharged laterally (and in opposite directions) into the false flask and flask proper. It will be observed by reference to Figs. 8 and 14 that in addition to the incline $G^4$ in each box the end is inclined at right angles, as at $G^{10}$, Fig. 13. The object of this incline is to carry the sand away from the edges of the flask. It also has another object. The end of the box opposite to this incline $G^{10}$ is provided with a removable door or slide $G^{11}$, so that when the machine is used to form the cope of a mold having a runner-box the latter can be supplied with sand through the opening left by the removal of the doors or slides $G^{11}$. The incline $G^{10}$ will direct the sand through these openings. Of course when the machine is not used with an inner false flask these openings are closed.

*Sprues and plunger.*—Supported by the partitions $B^2$ $B^3$, Fig. 5, is a vertical casing $B^5$, constituting what I will term the "plunger-casing," and moving vertically in this casing is a plunger H. This plunger and its accompanying sprues are of substantially the same construction as in my former application, the plunger being adapted to drop down and fill the runner-box of the flask in forming the cope portion of the mold and there being three sprues H', Fig. 5, engaged to a fitting $H^2$, which moves vertically in the plunger, the fitting being cushioned by a piston $H^3$, which enters the dash-pot $H^4$ in the lower end of the plunger. Engaged in the lower end of the casing $B^5$ is a plunger stripping-plate $B^6$, constituting the bearing for the lower end of the plunger. Supported by the upper end of the casing $B^5$ is a plate $H^5$, having a bearing $H^6$, in which is located what I will term a "crank-spool" $H^7$, a pitman $H^8$ being pivoted to the crank $H^{60}$ on the spool. Extending through the spool $H^7$ is a shaft $H^9$, having on its end a beveled gear $H^{10}$, which meshes with the beveled gear $H^{11}$ on the vertical shaft $H^{12}$. On the end of the spool $H^7$ is a disk $H^{13}$. On the end of the shaft $H^9$ is a crank-arm $H^{14}$, and pivoted thereto is a pitman $H^{15}$.

$H^{16}$ is a fitting traveling on the guide-rods $H^{17}$, the lower end of the pitman $H^{15}$ being pivoted to said fitting $H^{16}$. Located in this fitting is a vertical rod or shaft $H^{18}$, capable of turning on its vertical axis, with a spring $H^{19}$ for keeping it normally in one position. On the lower end of this rod is an arm or foot $H^{20}$, while on the upper end is another arm or foot $H^{21}$, Figs. 5 and 5ª. On the sprue-fitting $H^2$ is a vertical stem $H^{22}$, having notches $H^{23}$ in its face, in which the foot $H^{20}$ engages. On the face of the disk $H^{13}$ and at a distance of ninety degrees from each other are two stops $H^{24}$, and on the crank-arm $H^{14}$ are two arms $H^{25}$, extending outwardly therefrom in opposite directions, Fig. 5ᶜ. These arms come in contact with the stops $H^{24}$, so that when the shaft $H^9$ is revolved it will at certain points pick up the disk $H^{13}$ and revolve the spool. The pitman $H^8$ is pivoted to a plate $H^{26}$, so that when the spool is revolved the plate $H^{26}$ will be raised or lowered, as the case may be. Pivoted in this plate $H^{26}$ is a beveled catch $H^{27}$, the lower end terminating below the plate and adapted to engage the flange $H^{28}$ on the upper end of the plunger. Extending through the casing $B^5$ above the plate $H^{26}$, Fig. 5ª, is a lever $H^{29}$, said lever being engaged to the vertical rod $H^{30}$. This rod extends down to a point inside the casing and terminates adjacent to the horizontal shaft $E^{18}$, Figs. 8 and 26. This shaft through the link $E^{19}$ is revolved by the motion of the rod $E^9$, so that when the rod $E^{16}$ is moved downwardly to revolve the shaft $E^{13}$ the shaft $E^{18}$ will also be revolved. On this shaft $E^{18}$ is a vertical arm $H^{31}$, Fig. 5ª, and in dotted lines, Fig 8, and on the lower end of the rod $H^{30}$ is a horizontally-extending arm $H^{32}$, these two arms being connected by a rod $H^{33}$, so that a partial revolution of the shaft $E^{18}$ will revolve the vertical rod $H^{30}$ and throw the arm $H^{29}$ against the arm $H^{21}$, and thus release the foot $H^{20}$ from the notches in the sprue-fitting. Extending also through the casing $B^5$ adjacent to the catch $H^{27}$ is a lever $H^{34}$, adapted when tilted into the casing to strike the catch $H^{27}$ and release the plunger. This lever $H^{34}$ is engaged to a vertical rod $H^{35}$, on the lower end of which is a horizontal arm $H^{36}$, connected by a rod $H^{37}$ with a vertical arm $H^{40}$ on the shaft $E^{13}$. The engagement between the arm $H^{36}$ and the rod $H^{37}$ is slotted, so that the rod will move the length of the slot before it begins to act on the arm $H^{36}$, and thus revolve the rod $H^{35}$. The purpose of this is to enable the sprues to be released slightly in advance of the release of the plunger.

It will be seen by the above description that when the rod $E^{16}$ is pulled down it first releases the sprues and subsequently the plunger.

*Sand-reservoir.*—J, Fig. 3, represents the sand-reservoirs, each provided with discharge and inlet doors or valves. The particular construction of these doors or valves in this case is immaterial, since they may be duplicates of the doors or valves in my former application and may be operated in the same way. The discharge set, as in the former case, is released or opened by a revolution of the rod $J^3$, Figs. 3 and 8, the arm $J^{25}$ striking the catch $J^{26}$. This tilts the catch away from the gear $J^{26}$ and allows the doors to open, the revolution of this rod being obtained by means of a vertical arm $J^4$ on the shaft $E^{13}$, connected by a rod $J^5$ with the arm $J^6$ on the lower end of the rod $J^3$. Of course the mechanism just described is duplicated, there being one set for each reservoir.

Pivoted to the casing C by the stud $C^2$ is a sleeve $C^3$, Fig. 7, having two arms, one of which, $C^4$, curves outward and upward and is provided on the end with a set-screw $C^5$, and the other arm $C^6$ extends outward and bears upon the arm $C^7$, Fig. 11, on the end of the rod $E^{16}$ previously described.

Projecting from the flask is a lug $E^{20}$, Figs. 4, 9, and 26, which as the flask is lowered to its place in the machine strikes the set-screw $C^5$, tilts the lever $C^6$, and thus draws down the rod $E^{16}$. $E^{21}$, Figs. 10 and 11, is a spring surrounding this rod and keeping it normally in its upper position, so that as soon as the flask is withdrawn the spring $E^{21}$ will return the parts to their normal position.

It will be seen from the above description that with the lowering of the flask to its place in the machine the outer false flask, (where the cope part of the mold is being formed,) the inner false flask, the sand-delivery boxes, the sprues, and the plunger are all released and allowed to drop down, and at the same time the sand is released and fills the flasks. We are now ready for the movement of the pattern parts to form the mold.

*Pattern-operating mechanism.*—The flask and pattern supporting parts are shown principally in Figs. 4, 6, and 7, each one being a sectional view at right angles to the others. It should be understood at the outset that in the present machine there are virtually two sets of pattern and flask supporting mechanisms, and while they are duplicates of each other and are both carried by the plate $A^7$, yet by a change in the adjustment of the tripping mechanism they may or may not operate in the same relative order. In describing them I will describe only one set; but since in Figs. 6 and 7 one set is shown in section, while the other set is shown more or less in elevation I will in describing refer to whichever side shows the parts more clearly. Supported from the plate $A^7$ are standards $A^{10}$ $A^{11}$, and carried in bearings on the upper ends of these standards is a crank-shaft $A^{12}$, and pivoted on the cranks thereof are pitmen $A^{13}$, the lower ends of said pitmen being pivoted to a frame K. Fitting over the exterior of this frame, which is circular in form, is a ring $K'$, having its exterior surface threaded and held in place by the ring $K^2$, fastened to the frame K by screws. $K^3$ is a frame adapted to fit the exterior of the ring $K'$ and threaded to engage the same. Carried by this frame are the arms $K^4$, which are provided with rods $K^5$, and extend up through the bearings $C^7$ on the casing C. Above each rod $K^5$ is another rod $K^6$, which extends through the plate $C^8$ on the upper end of the casing C. The rods $K^6$ are free to move vertically, and to their upper ends is engaged the frame $K^7$, which forms the lower sand-box or lower false flask and the flask-support. $K^8$ is another ring exteriorly threaded to fit interior threads on the frame K. M is another frame bored vertically, as at $M'$, to receive the guide-stem $M^2$, which extends up from the plate $A^7$. At the initial stage in the operation this frame M rests on and is supported by the frame $K^8$, which extends up from the frame K. Extending up from the frame M are four standards $M^3$, Fig. 7, having their faces beveled to fit in the guides $C^9$ on the interior face of the casing C. In addition to the four standards just described there are two other sets of standards of four each, $M^4$ and $M^5$, all extending up from the frame M. The twelve standards just described as extending up from the frame M constitute one set of pattern-supporting mechanism. The standards $M^5$ are provided on their upper ends with strips $M^6$, while the standards $M^3$ $M^4$ are provided with a rectangular frame $M^7$. Of course as the frame M moves vertically these pattern-supporting strips $M^6$ $M^7$ will move vertically. Journaled in suitable bearings in the frame M is a crank-shaft $M^8$, and pivoted to the cranks thereof are pitmen $M^9$, their upper ends being pivoted to a ring $M^{10}$, interiorly threaded, as at $M^{11}$, and provided with an adjustable ring $M^{12}$, threaded to fit the threads $M^{11}$. Extending up from the frame M is a hollow cylindrical bearing $M^{13}$, around which the ring $M^{12}$ fits and by which it is steadied and guided. O is another frame having a downwardly-extending stem $O'$, which is guided by the cylinder $M^{13}$. This frame O is carried by the ring $M^{12}$. Extending up from the frame O are sixteen standards $O^2$, each corner-standard working along the interior face of a standard $M^3$ and the frame O being thereby steadied and guided. Each longitudinal set of four of the standards $O^2$ carry on their upper ends a strip $O^3$, so that there are four of the pattern-supporting strips $O^3$ supported from the frame O. Extending from the upper ends of the standards $A^{10}$ $A^{11}$ are standards P, which support a pattern-supporting strip P'. Extending from the plate $C^8$ is a ring or frame $C^{10}$, and supported by the upper edge of this ring is a plate $C^{11}$, constituting the stripping-plate. The frame or ring $C^{10}$ is attached to the plate $C^8$, and thus forms a guide for the flask-support or lower false flask $K^7$. By referring to Figs. 6 and 7 it will be seen that the frame $C^{10}$ is a double frame—that is, there is one for each set of pattern mechanism—so that if the machine is used as a double machine there will be a guide for each flask-support. Each of the two frames $C^{10}$ is, however, cut away, as at $C^{14}$, so that when but a single flask is used, employing the entire width of the pattern mechanism, the patterns will have space in which to move.

It will be observed from the above description that the flask-support or lower false flask $K^7$ is carried by the frame K and that the latter can, through the crank-shaft $A^{12}$, be stopped in its upward movement at any time that said shaft is tripped. It will also be observed that the pattern-supporting strips $M^6$ $M^7$ are carried by the frame M, which latter is carried at the initial stage of the operation by the frame K, so that when the frame K ceases its upward movement with respect to the pressure-plate above the pattern-strips $M^6$ $M^7$ cease their upward movement. It will be further observed that the pattern-supporting strips $O^3$ are carried by the frame O, which in turn is carried from the frame M by the crank-shaft $M^8$, so that when the crank-shaft $M^8$ is tripped the pattern-strips $O^3$ will cease their upward movement with respect to the pressure-plate above. If desired, the pattern-supporting strips $M^6$ $M^7$ $O^3$ P' may be be provided with orifices W, employed either to guide the pattern parts or to secure them.

I will now describe the tripping mechanism whereby the crank-shafts $A^{12}$ and $M^8$ are tripped at the desired time.

*Tripping mechanism.*—As previously explained, the casing D, containing the tripping mechanism, is engaged to the upright standards $A^9$. This tripping mechanism is shown in detail in Figs. 9, 10, and 11. Located on the interior of the casing D is a peculiar-shaped rack-bar D'. (Shown in elevation in Fig. 9.) On the shaft $A^{12}$, which projects through the slot $C^{12}$ of the casing C, is a peculiar-shaped segment $D^2$, having an arm $D^3$ set out of the vertical plane of the segment portion $D^4$. At the upper end of the rack-bar D' is an adjustable screw-stop $D^5$ in line with the arm $D^3$ and adapted to be struck thereby. Now as the shaft $A^{12}$ ascends at the proper time, depending upon the adjustment of the screw $D^5$, the arm $D^3$ strikes the screw $D^5$ and revolves the shaft. As soon as the shaft is thrown off its center the weight of the parts thereon will give it a half-revolution, and this will bring the arm $D^6$ of the segment $D^2$ around so that it bears on the upper end $D^7$ of the rack-bar. Then as the shaft descends later on the segment $D^4$ will engage the rack portion $D^8$ of the rack-bar and revolve the shaft back to its normal or initial position, the end $D^9$ of the segment riding against the face $D^{10}$ of the rack-bar. Surrounding the shaft $A^{12}$ is a sleeve $A^{14}$, Fig. 4, having on its end a beveled gear $A^{15}$, which meshes with the beveled gear $A^{16}$ on the vertical shaft $A^{17}$. Carried by the frame M is a sleeve $M^{14}$, which carries a beveled gear $M^{15}$, the latter engaged to the shaft $A^{17}$ by a feathered engagement, so that it will revolve with the shaft and be capable of moving vertically thereon. Meshing with the beveled gear $M^{15}$ is another beveled gear $M^{16}$, located on the shaft $M^8$. On the sleeve $A^{14}$ is another segment $D^{11}$, Figs. 10 and 11, a duplicate of the segment $D^2$ and adjacent thereto. On the casing D is another rack-bar $D^{12}$, corresponding with the rack-bar D', said rack-bar $D^{12}$ provided with an adjustable stop-screw $D^{13}$. The operation of tripping the shaft $M^8$ is identical with that of tripping the shaft $A^{12}$. By regulating the respective heights of the set-screws $D^5$ and $D^{13}$ shafts $M^8$ and $A^{12}$ can be tripped at the desired time. Surrounding the depending stem-bearing $M^{17}$, Fig. 4, is a ring Q, and pivoted thereto are rods or hangers Q', Fig. 6, which extend up and are engaged to the cranks on the crank-shaft $Q^2$. This shaft has its bearing at the ends in the bearings $Q^3$ on the interior of the casing C and at the middle in the bearing $Q^4$, carried by the upright standard $Q^5$ on the plate $A^7$. On the shaft $Q^2$ is a beveled gear $Q^6$, which meshes with a beveled gear $Q^7$, Fig. 7, on the shaft $Q^8$, the latter extending out through a slot $C^{13}$, Fig. 9, in the casing C into the tripping-casing D. Here it is provided with a segment $D^{14}$, corresponding with the segments $D^2$ and $D^{11}$, and on the casing adjacent thereto is a rack-bar $D^{15}$, corresponding with the rack-bars D' and $D^{12}$. There is also provided an adjustable set-screw $D^{16}$; but instead of this set-screw being mounted on the rack-bar and adapted to be struck by the segment in ascending the set-screw $D^{16}$ is located on an arm on the rod $R^{11}$, which, as hereinafter explained, is at a given stage in the operation moved downward, and this causes the set-screw $D^{16}$ to tilt the shaft $Q^2$.

Before describing the operation of the pattern-supporting parts I will call attention to the fact that each of the frames carrying the pattern and flask supporting parts is provided with a dash-cup to cushion its descent when it is tripped. Located on the plate $A^7$ is a circular dash-pot $A^{18}$, Fig. 4, provided with a vertical partition $A^{19}$, extending entirely around the same, so that it is divided into two compartments. In the outer compartment $A^{20}$ is a circular ring $A^{21}$, which constitutes a piston for the compartment $A^{20}$. This ring $A^{21}$ is connected with the frame K by means of the rods $K^9$, engaged to lugs on the inner face of the ring $K^8$. The inner compartment $A^{22}$ of the dash-pot is provided with a similar ring $A^{23}$ and connected with the ring Q by the rods $Q^9$. Located on the frame M are two dash-pots $M^{18}$ for cushioning the frame $M^{10}$, rods $M^{19}$ extending from said frame $M^{10}$ down to the dash-pots. The frame M needs no cushioning, because it is either carried by the frame K or by the ring Q.

*Operation of forming mold.*—The operation of the pattern and flask supporting parts will now be understood. Pivoted in the casing D is a shaft $D^{17}$, Fig. 9, having a handle $D^{18}$ and an arm $D^{19}$, and pivoted to the arm $D^{19}$ is the rod $A^5$, previously described, which connects with the valve-arm $A^4$ for the main cylinder. By tilting the handle $D^{18}$ the power fluid is admitted to the cylinder and the piston is forced upward, carrying with it the plate $A^7$ and all the accompanying parts. The patterns are of course adapted to rest on the pattern-supporting strips. These patterns are, as described in my previous application, divided into as many parts as necessary in order to get the proper compression of the sand in the mold upon each particular height of the pattern. As fully elaborated in my previous application, the secret of successful machine-molding is to secure above each particular height of the pattern that compression of the sand which is requisite when the iron is poured to properly mold the latter. It should also be remembered that with a stationary pressure-plate above so long as the pattern parts and flask are all moving toward said stationary plate the compression will be along the pressure-plate, or, in other words, in the top of the flask, that when any particular part of the pattern ceases its movement toward the pressure-plate the compression above that part ceases, and that whenever any pattern part is moved toward the pressure-plate, with the flask remaining stationary with respect to the pressure-plate, the compression of the sand will be along the the face of the pattern, or, in other words, in the lower part of the flask. Now as previously explained, in addition to the flask-supporting rods $K^5$, which carry the rods $K^6$, but can move down independent of the latter, there are three sets of pattern-supporting parts. There is the strip P', which is supported from the plate $A^7$ and movable only therewith. There are the strips $O^3$, which are carried by the frame O, and the latter is carried by the crank-shaft $M^8$ on the frame M, so that when the crank-shaft $M^8$ is tripped, as previously explained, the strips $O^3$ will give way, or, in other words, remain stationary with respect to the pressure-plate above, while the rest of the parts continue to advance. There are also the strips $M^6$ $M^7$, which are carried by the frame M, and the latter being carried by the frame K, which is in turn carried by the crank-shaft $A^{12}$. When the crank-shaft $A^{12}$ is tripped, the strips $M^6$ $M^7$ will remain stationary with respect to the pressure-plate above, while the strip P' and plate $C^8$ on the casing C continue to advance. Of course when the strips $M^6$ $M^7$ cease their upward movement the flask also ceases its upward movement. In the meantime, however, when the shaft $A^{12}$ is tripped and the frame K thus caused to cease its upward movement the frame Q is still advancing, and it picks up the frame M and carries it away from the frame K, thus carrying upward the pattern-supporting parts, including $M^6$, $M^7$ and $O^3$, while the flask remains stationary with respect to the pressure-plate. Now, as will be seen, the movements of $M^6$, $M^7$, and $O^3$ and the flask depend entirely on the time when the shafts $M^{12}$ and $M^8$ are tripped. If it is desired that the strips $O^3$, $M^6$, and $M^7$ shall remain in the same relative position, the shaft $A^{12}$ alone is tripped. This will cause the flask and the strips $M^6$ $M^7$ $O^3$ to stand still, while the trip P' advances until the frame Q picks up the frame M, when all the parts will be advanced, leaving the flask alone stationary; or, on the other hand, if it is desired to have the strips $O^3$ cease their upward movement first then the shaft $M^8$ is tripped first, while the strips P', $M^6$, and $M^7$ and the flask continue to advance until the frame O is overtaken by the ring $M^{13}$ on the frame M, and then the shaft $A^{12}$ can be tripped, and this will cause the flask and parts $M^6$ and $M^7$ and $O^3$ to stand still while the part P' is advancing until the frame Q overtakes the frame M, when all the pattern-strips will be advanced, leaving the flask stationary; or, on the other hand, if it is desired that the strips $O^3$ shall cease their initial movement when the strips $M^6$ $M^7$ cease their movement and shall remain stationary when the strips $M^6$ $M^7$ later again begin their upward movement the operation would be to trip the shafts $M^8$ and $A^{12}$ substantially simultaneously. This would cause the strips $O^3$ $M^6$ $M^7$ and the flask to cease their movements while the strip P' advances; but as soon as the frame Q overtakes the frame M it would cause the strips $M^6$ $M^7$ to advance, while the pressure above the strips $O^3$ would prevent their advance until the frame M had, through the ring $M^{13}$, picked up the frame O, when all the parts would be advanced, with the flask remaining stationary. In addition to the above it will be seen that by adjusting the height of the ring $M^{12}$ the frame O can be adjusted at such a height that even when the shaft $M^8$ is tripped, thus allowing the strips $O^3$ to remain stationary with respect to the pressure-plate, the ring $M^{13}$ on the frame M will not reach the frame O until the plate $A^7$ has reached its maximum height, so that after the initial advance of the strips $O^3$ and when they are tripped they remain stationary with respect to the pressure-plate throughout the balance of the operation.

From the above description it will at once be seen that by providing the patterns with suitable legs or engaging portions any pattern-piece can be successively advanced toward and held stationary with respect to the pressure-plate for any desired length of time and that thereby the sand, either along the top of the flask over any pattern part or along the face of the pattern over any pattern part, can be given any desired compression.

*Insertion of the vent-pins.*—Projecting from the face of the casing C, Fig. 7, is an arm R, pivoted at R' to swing horizontally and provided with a spring $R^2$, adapted to keep it normally against the face of the switch which I will presently describe. Extending vertically through the casing D, Fig. 9, and adjacent to the side of the casing C is a rod $R^5$, pivoted on its upper end to the arm $R^6$ on the shaft $R^7$, the latter provided with a handle $R^8$. The lower end of the rod $R^5$ is pivoted to the valve-arm of the valve in the cylinder $R^9$, Fig. 1. On the rod $R^5$ is a shoulder $R^{10}$, Fig. 11, and the shoulder $R^4$ of the arm R comes in contact with this shoulder $R^{10}$ when the casing C moves upward, and thus moves the rod $R^5$ upward, and this opens the valve and allows the fluid to enter the cylinder $R^9$ and raise the piston. The piston-rod $R^{11}$ extends through the casing D to the upper part of the machine, where its purpose will presently be explained. In order that the arm R on the casing C shall not interfere with the rod $R^5$ when the casing descends, I provide a switch, (shown by dotted lines, Fig. 9,) the switch-point $R^{12}$ keeping the end $R^3$ of the arm out into the path of the projection $R^{10}$, so that the arm R will move the rod up in its upward movement; but as soon as the arm R has cleared the switch $R^{12}$ the spring $R^2$ throws the arm R over so that its end $R^3$ rides against the track $R^{13}$, and when the casing and arm R descend they are thus caused to clear the projection $R^{10}$. This switch mechanism is clearly described in my previous application and I will not further dwell upon it. Journaled in the casing B, Fig. 1, is a shaft $R^{14}$, provided on its end with a crank-arm $R^{15}$, connected with the rod $R^{11}$ by a link $R^{16}$. On the shaft $R^{14}$, Fig. 8, is a pinion $R^{17}$, and meshing therewith is another pinion $R^{18}$ on the shaft $R^{19}$, the latter journaled in the frame. The pinion $R^{18}$ meshes with the pinion $R^{20}$ on the crank-shaft $R^{21}$. On the opposite side of the sand-box is another crank-shaft $R^{22}$, having a pinion $R^{23}$, which meshes with the pinion $R^{17}$, so that a movement upward of the rod $R^{11}$ revolves the crank-shafts $R^{21}$ $R^{22}$. Pivoted to the cranks of these crank-shafts are pitmen $R^{24}$, Fig. 3, and pivoted to the ends of these pitmen are what I will term the "vent-pin boards" $R^{27}$. These vent-pin boards are guided in their vertical movement by the guides $R^{25}$, Fig. 8, working in guideways $R^{26}$ on the outer casing B and on the inner partitions $B^2$ $B^3$. The construction of the vent-pin boards, so far as the vent-pins are concerned, is substantially the same as in my previous application. They are shown in detail in Figs. 17 and 19, and consist of a main plate $R^{27}$, with clamping-strips $R^{28}$ and tightening-strips $R^{29}$, held by screws $R^{30}$. The vent-pins $R^{31}$ can of course be adjusted to any height desired. Now, as just explained, when the casing C moves upward it operates, through the rod $R^{11}$, to force the vent-pins down into the mold, the vent-pins of course passing through suitable orifices in the pressure-plate $B^4$.

*Mechanism for filling the sand-reservoirs.*—Located on the shaft $R^{22}$, Fig. 3, is a pinion $R^{32}$, which meshes with the pinion $R^{33}$ on the shaft $R^{34}$. On the same shaft is a beveled gear $R^{35}$, which meshes with the beveled gear $R^{36}$ on the vertical shaft $H^{12}$. The latter has been explained in connection with the plunger. Located also on the shaft $R^{34}$ are two beveled gears $R^{37}$ $R^{38}$, there being one for each of the sand-reservoirs. Each gear is mounted on a vertical shaft $R^{55}$. On the trunnions of the said doors are segments $R^{56}$ $R^{57}$, which mesh with the gears $R^{58}$, having beveled segments $R^{59}$ on their faces, which mesh with beveled gears $R^{60}$ on the shaft $R^{61}$. The shafts $R^{55}$ and $R^{61}$ are connected by the gear $R^{62}$ and segment $R^{63}$, so that a revolution of the shaft $R^{55}$ operates the sand-doors. The mechanism for operating the sand-doors to fill the sand-reservoirs is identical to that described in my previous application, and inasmuch as it is not claimed in this case I will not further describe it. Suffice to say, that a revolution of the beveled gears $R^{39}$ $R^{40}$, through the medium of the beveled gears $R^{27}$ $R^{38}$, operates the sand-doors, so that as the vent-pins descend the lower sand-doors are closed and the upper sand-doors open, thus allowing the reservoirs to fill, while as the vent-pins are withdrawn the upper sand-doors are closed. Of course while I have described the insertion of the vent-pins after the description of the formation of the mold, yet the arm R is so located on the casing C that it causes the vent-pins to operate considerably in advance of the pattern. I have also explained how the shaft $H^{12}$ is revolved when the vent-pins are being inserted. This revolution of the shaft $H^{12}$ revolves the shaft $H^9$, Fig. 5. This revolution of the shaft $H^9$ causes one of the arms $H^{25}$ to come into contact with the shoulder $H^{24}$ on the spool $H^7$ and revolves the latter, thus throwing the plate $H^{26}$ down to its lower position. Now as the plunger H is forced up by the upwardly-moving flask, or, perhaps more correctly speaking, the sand in the flask, the upper end of the plunger strikes the plate $H^{25}$ and is held from further upward movement, thus compressing the sand in the runner-box of the flask. The particular point at which the plunger is arrested in its upward movement is regulated by the screw-ring $H^{38}$ on the upper end of the plunger, which can of course be adjusted to any height desired. When the plunger reaches the plate $H^{26}$, the beveled catch $H^{27}$ engages the plunger, as previously explained.

It will be seen that thus far we have formed the mold, inserted the vent-pins, and filled the sand-reservoirs. We are now ready to withdraw the vent-pins and strip the sprues, plunger, and patterns.

*Stripping mechanism.*—The operator, by means of the handle $R^8$, Fig. 9, throws down the rod $R^5$, and this reverses the valve in the cylinder $R^9$, allows the fluid to enter above the piston, and pulls down the rod $R^{11}$. Through the mechanism previously described this revolves the crank-shafts $R^{21}$ $R^{22}$ and withdraws the vent-pins. It also revolves the shaft $H^{12}$ in the opposite direction. Now when the shaft $H^{12}$ is revolved this reversed revolution thereof causes the rod $H^{15}$, connected with the crank-arm $H^{14}$ on the shaft $H^9$, to withdraw the sprues along the face of the plunger until the arm $H^{25}$ comes in contact with the other shoulder $H^{24}$ on the disk $H^{13}$, when the spool will be revolved and the plunger lifted, the latter stripping through the plate $B^6$.

As previously explained, the adjustable screw or pin $D^{16}$, which operates the segment $D^{14}$, is located on the rod $R^{11}$, and, as will be remembered, it is the downward movement of this rod that withdraws the vent-pins, sprues, and plunger. It will also be remembered that the segment $D^{14}$ when revolved trips the shaft $Q^2$ and that at the completion of the operation of forming the mold the pattern-supporting parts $M^6$, $M^7$, and $O^3$ are all supported from the frame Q, and consequently the shaft $Q^2$. Now when the rod $R^{11}$ moves downward the pin $D^{16}$ trips the shaft $Q^2$, and this permits all those pattern parts that are supported from the strips $M^6$, $M^7$, and $O^3$ to drop away from the mold. If the pattern is of such a nature or shape that it is desired to keep any portions of the pattern into the mold to support the sand until the other portions have dropped out, the patterns can be so arranged as to be supported at the closing movement of the operation of forming the mold either by the plate $C^8$ or strip $P^7$. As soon as the rod $R^{11}$ has tripped the shaft $Q^2$ the arm $R^{41}$, Fig. 1, on the rod $R^{11}$ comes into contact with the stop $R^{42}$ on the rod $A^5$ and depresses the rod $A^5$, thus opening the valve in the cylinder $A'$ and allowing the pressure fluid to escape and thus allow the plate $A^7$ to descend. In order that the arm $R^{41}$ can clear the stop $R^{42}$ when it ascends, a switch arrangement $R^{43}$, similar to that already described and similar to those in my previous application, is provided.

*Drag-machine.*—Throughout the above description I have assumed that the machine was adjusted to form the cope portion of a mold which would take substantially the entire capacity of the machine—that is to say, I have assumed that the plunger would be in operation and that but a single flask proper would be in the machine. I now wish to call attention to the fact that in case the drag portion of the mold is to be formed, which will require a flask substantially the size of the machine, it is only necessary to disconnect the tripping devices for the inner false flask, the plunger, and the sprues accompanying the plunger, and to remove, say, the gear $R^{36}$. Then when the sand has been let into the flask a bottom board (shown at S, Fig. 26) can be inserted. This bottom board can be of the same construction as that shown in my prior application, with orifices to allow the vent-pins to pass through. In order that after the pressure has taken place and after the false flask has been forced up past the bottom board and brought the latter down to the flask proper the false flask can be lifted off from the flask to permit the bottom board to be clamped onto the flask proper, I provide on the casing C rods $S'$, which, coming in contact with the adjustable screws $S^2$ on the false flask, lift the latter away from the flask proper and allow the bottom board to be clamped to it. Again, supposing that instead of a single pattern made up of several pieces it is desired to form the cope-mold of several distinct patterns, using but a single flask—that is, one that substantially fills the machine—I leave the plunger and its accompanying sprues still disconnected and fill up the opening in the pressure-plate through which the plunger and its accompanying sprues pass, thus making a practically solid pressure-plate. Obviously when this is done it is necessary to provide at the necessary points other sprue-holes, and this is accomplished by the following mechanism:

*Auxiliary sprues.*—In the pressure-plate, at desirable points, are orifices which when these additional sprues, which I will term "auxiliary" sprues, are not in use are plugged up by means of the plugs T, Figs. 5 and 18. When, however, it is desired to use these auxiliary sprues, I remove the plug T and insert a plug $T'$, having an orifice through it through which the sprue $T^2$ can pass and strip. Each of these auxiliary sprues $T^2$ is constructed as follows, Figs. 20 to 25: It is hollow, as in my previous application, and extends through a tube $T^3$, which is screwed into the vent-pin board or frame $R^{27}$. On the upper end the tube $T^2$ is provided with a ring $T^4$ to form a guide in its movement through the tube $T^2$. It also forms a shoulder by means of which the sprue is held in its upper position. On the interior of the sprue $T^2$ is a shoulder $T^5$, and threaded into the cap $T^6$ of the tube $T^3$ is a fitting $T^7$, with a vertically-movable stem $T^8$ therethrough, and a spring $T^9$, one end bearing on the end $T^{10}$ of the stem $T^8$, while the other end bears on the adjustable fitting $T^7$. Journaled in the bearings or lugs $T^{11}$ of the tube $T^3$ is a rod $T^{12}$, and engaged to this rod is a door $T^{13}$, adapted to fill an opening in the side of the tube $T^3$ and having its exterior face notched or provided with a series of beveled catches $T^{14}$. The shoulder $T^4$ on the upper end of the sprue engages on one of these catches $T^{14}$, and the sprue is held up thereby, a spring $T^{15}$ keeping the parts in engagement until intentionally released. Adjustably keyed to the rod $T^{12}$ is an arm $T^{16}$. Journaled in the casing B, Fig. 8, along the side thereof, is a shaft $T^{17}$, having an upwardly-extending arm $T^{18}$, connected by the rod $T^{19}$ with an upwardly-extending arm $T^{20}$ on the shaft $E^{18}$. On the opposite side of the casing is another shaft $T^{21}$, having an upwardly-extending arm $T^{25}$, connected by the rod $T^{22}$ with an upwardly-extending arm $T^{26}$ on the shaft $E^{13}$. Located on the rods $T^{19}$ and $T^{22}$ are depending arms $T^{23}$, adjustable along the rod. Now as the shafts $E^{13}$ and $E^{18}$ are tilted to release the false flask and other parts the arm $T^{23}$, striking the arm $T^{16}$, revolves the rod $T^{12}$, opens the door $T^{13}$, and allows the sprue to drop, the spring $T^9$ starting it quickly in its descent. As in my previous application, the sprue drops over a projection $T^{24}$ on the pattern and is at once cushioned and held in place. From the above description it will be seen that these auxiliary sprues can be located at any point desired, since the arms $T^{18}$ to $T^{20}$, carrying the rod $T^{19}$, can be adjusted to any point desired on their respective shafts, and their number can be increased, as desired, and the depending arms $T^{23}$ can be adjusted at any point along their respective rods and their number increased or decreased, as desired. So, also, the orifices for the sprues through the vent-pin board and pressure-plate can be made at the desired point. When the vent-pin board is thrown down to insert the vent-pins, as previously described, the tubes $T^3$ and their accompanying engaging mechanism are carried down, so that when the sprues $T^2$ are carried up by the ascending pattern mechanism each will be engaged, and when the vent-pins are withdrawn, as previously described, the sprues $T^2$ are also withdrawn.

*Double Machine*—Another feature of the machine to which I have briefly alluded and which I will now more fully describe is the fact that it is a double machine—that is, there are two sand-delivery boxes, there are two sets of pattern and flask supporting mechanism, and two sets of vent-pins and auxiliary sprues. Now by substituting for the single flask shown, for instance, in Fig. 26 two flasks, as shown at U U', Fig. 27, both the cope and the drag portion of the mold can be simultaneously formed. When this is done, the plunger and its accompanying sprues and the inner false flask will remain disconnected and out of use. In that event, however, the plate which has been inserted in the pressure-plate to fill the opening through which the plunger when in use passes will be removed, and the bottom plates $G^{13}$ on the sand-boxes will also be removed. These removals are to permit the inner edges of each of the two false flasks $U^2$ $U^3$ to pass up past the pressure-plate and past the lower edge of each sand-box to be engaged by their respective catches. For the same reason, also, the partition $B^{10}$, Figs. 8 and 13, which connects the partitions $B^2$ $B^3$, is cut away, as at $B^{11}$. It will be remembered that I described the sand-delivery boxes as being returned to their upper or normal position by the upwardly-moving sand and held up by the false flask striking the screws $G^2$. When, however, two flasks are used, such as I am now describing, the sand-delivery boxes are between the two flasks, and the false flasks in their ascent will strike the screws $G^{12}$ instead of the screws $G^2$ and will carry the boxes up and hold them thereby. Of course when the two flasks are used, one to form the cope and the other the drag portion of the mold, the casing on that side which is forming the drag portion of the mold must be provided with rods $U^4$ to engage the false flask and lift it off from the flask proper, so that the bottom board can be clamped onto the flask, as previously explained.

*Conclusion*—It will be seen from the above description that I have produced a machine which will form a mold (either cope or drag) from a pattern of any conceivable shape and of any size within the limits of a flask that fills the entire machine irrespective of any differences in the shape, location, or height of the different parts of the pattern, one in which the number of small molds in a single flask is limited only by the size of the flask and irrespective of the difference in size or height of the different patterns, and one in which both the cope and drag portions of the mold may be formed either of a single mold or of any number of molds in a single flask, depending only on the size of the flask.

It is obvious, as in my former application, that, while I have shown a stationary pressure mechanism above the flask and movable pressure mechanism below the flask, I do not wish to be limited in this direction, since many of the parts might be reversed or changed or altered without departing from the spirit of the invention.

What I claim is—

1. In a molding-machine two or more sets of pattern and of flask supporting mechanisms, each set comprising two or more pattern-supporting parts movable independently of each other and vertically-movable mechanism from which all the pattern parts are supported, substantially as described.

2. In a molding-machine two sets of pattern and flask supporting mechanism each set comprising two or more pattern and flask supporting parts, pressure mechanism above said pattern parts, common supporting mechanism for all the pattern and flask supporting parts; mechanism for moving the pattern and flask supporting parts relatively to the pressure mechanism and independent tripping mechanism for each set of pattern and flask supporting parts, substantially as described.

3. In a molding-machine two sets of pattern and flask supporting mechanism each set comprising two or more pattern and flask supporting parts, pressure mechanism above said pattern parts, common supporting mechanism for all the pattern and flask supporting parts, mechanism for moving the pattern and flask supporting parts relative to the pressure mechanism and independent sets of tripping mechanism one set for each set of pattern and flask supporting mechanism, each set of tripping mechanism comprising independent tripping mechanism for each of the pattern and flask supporting parts, substantially as described.

4. In a molding-machine a vertically-movable plate or head carrying two sets of pattern and of flask supporting mechanisms, each set comprising two or more flask and pattern supporting parts movable independently of each other and common stationary pressure mechanism, above the parts, substantially as described.

5. In a molding-machine a vertically-movable head or plate carrying two sets of pattern and flask supporting mechanism each set composed of two or more pattern and flask supporting parts movable independently of each other, common stationary pressure mechanism above the parts and tripping mechanism for tripping the parts independently of each other as they ascend, substantially as described.

6. In a molding-machine two sets of pattern and flask supporting mechanism each set comprising two or more pattern and flask supporting parts all carried from a common vertically-movable part, said pattern-supporting parts movable independently of each other pressure mechanism above said pattern parts; mechanism for moving the pattern parts with respect to the pressure mechanism to effect the compression and common mechanism for simultaneously tripping the parts in both sets after the compression has been completed, substantially as described.

7. In a molding-machine a vertically-movable head or plate carrying two sets of pattern and flask supporting mechanism each set composed of two or more pattern and flask supporting parts movable independently of each other, common stationary pressure mechanism above the parts, tripping mechanism for tripping the parts independently of each other as they ascend and common mechanism for tripping the parts in both sets simultaneously after the compression has been completed, substantially as described.

8. In a molding-machine the combination of an outer and an inner false flask; mechanism for engaging each in its upper position and mechanism for releasing said engaging mechanism to allow the flasks to drop simultaneously, substantially as described.

9. In a molding-machine, the combination with the flask proper of an outer and an inner false flask; mechanism for suspending each in the machine above the flask proper a projection in line with the movement of the flask proper; mechanism adapted to be struck thereby and connections between said projection and the suspending mechanisms for the false flasks whereby the movement of the flask mechanism releases the false flasks and allows them to drop, substantially as described.

10. In a molding-machine the combination with the flask and pattern mechanism of a vertically-movable plate above the flask carrying a series of vent-pins and a series of sprues carried by said plate and movable independent thereof, substantially as described.

11. In a molding-machine the combination with the flask and pattern mechanism of a vertically-movable plate above said flask carrying a series of vent-pins, one or more sprues adapted to move in said plate, mechanism carried by said plate for engaging the sprue or sprues in their upper position and mechanism for releasing said sprue or sprues to allow them to drop independent of the movement of the plate, substantially as described.

12. In a molding-machine the combination with the flask mechanism adapted to be moved to its place in the machine, of a vertically-movable plate located above the flask mechanism, a series of vent-pins carried by said plate, one or more sprues carried by said plate but movable independent thereof, engaging mechanism for said sprue or sprues, an engaging portion in line with the movement of the flask mechanism and connections between said engaging portion and the sprue-engaging mechanism whereby a movement of the flask mechanism moves the engaging portion releases the sprue or sprues and allows the latter to drop independent of the movement of the plate, substantially as described.

13. In a molding-machine the combination with the flask mechanism adapted to be moved to its place in the machine, of a vertically-movable plate located above the flask mechanism, a series of vent-pins carried by said plate, one or more sprues carried by said plate but movable independent thereof, engaging mechanism carried by said plate for said sprue or sprues, an engaging portion in line with the movement of the flask mechanism and connections between said engaging portion and the sprue-engaging mechanism whereby a movement of the flask mechanism moves the engaging portion, releases the sprue or sprues and allows the latter to drop independent of the movement of the plate, substantially as described.

14. In a molding-machine the combination with the flask and pattern supporting mechanism and the false flask of rods extending up from the flask and pattern supporting mechanism, adapted to engage and lift the false flask at the latter end of the movement of the flask and pattern supporting mechanism, one of the engaging members between the pattern-supporting mechanism and the false flask being adjustable, substantially as described.

15. In a molding-machine the combination with the flask and pattern supporting mechanism and the false flask, of rods extending up from the flask and pattern supporting mechanism adapted to engage and lift the false flask at the latter end of the movement of the false-flask and pattern supporting mechanism and adjustable screws carried by the false flask with which the rods come in contact, substantially as described.

16. In a molding-machine the combination with two sets of pattern and flask supporting mechanism of a stationary pressure-plate located above both of said sets, said pressure-plate provided longitudinally with openings whereby two pressure-plates are provided one above each set of pattern and flask supporting mechanism, and removable plates to fill said openings to provide a single plate extending over both sets of pattern mechanism, substantially as described.

17. In a molding-machine the combination with two sets of pattern and flask supporting mechanism of a stationary pressure-plate above the same and having openings, sand-delivery boxes located above said pressure-plate and adapted to drop down through the openings in the same to deliver the sand and another opening in the pressure-plate in line with and connecting the openings for the sand-delivery boxes whereby two pressure-plates are provided one above each set of pattern and flask supporting mechanism, substantially as described.

In testimony whereof I sign this specification in the presence of two witnesses.

HARRY C. COOPER.

Witnesses:
GERTRUDE HEIDELBERGER,
LUTE S. ALTER.